No. 830,091. PATENTED SEPT. 4, 1906.
F. MALINA.
CELESTIAL GLOBE.
APPLICATION FILED JAN. 31, 1905.

Witnesses
Inventor
Franz Malina

ATTORNEYS.

UNITED STATES PATENT OFFICE.

FRANZ MALINA, OF VIENNA, AUSTRIA-HUNGARY.

CELESTIAL GLOBE.

No. 830,091.  Specification of Letters Patent.  Patented Sept. 4, 1906.

Application filed January 31, 1905. Serial No. 243,563.

*To all whom it may concern:*

Be it known that I, FRANZ MALINA, a subject of the Emperor of Austria-Hungary, residing at 14 Koppstrasse, in the city of Vienna, Province of Lower Austria and Empire of Austria-Hungary, have invented new and useful Improvements in Celestial Globes, of which the following is a specification.

The present invention relates to celestial globes, and especially to instruments adapted to indicate the apparent movement of the sun and stars from hour to hour, the varying length of daylight at different seasons, and the time and place of rising and setting of the sun and the stars as well as their place in the sky at any hour for any given locality.

The object of the invention is to create an instrument of this kind which is very simple in construction and use. According to the invention a hemispherical transparent or perforated cap is arranged rotatable on the pole of the globe, which is itself rotatable around its axis, the edge of said cap corresponding to the horizon of the place of observation selected, so that the cap covers all the constellations visible from the said place of observation. The globe has a mark representing the sun displaceable in the ecliptic according to the date of observation, while the cap is provided with a time-dial and marks representing the zenith and the points of the compass.

Figure 1:
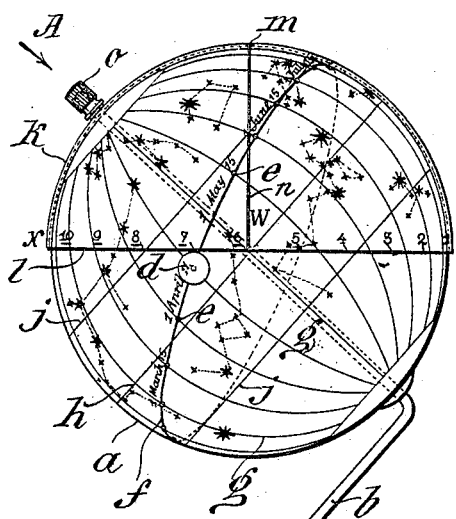
Figure 2:
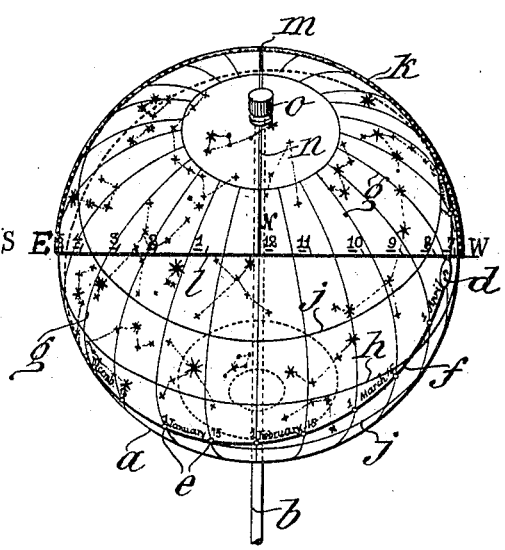
Figure 2:
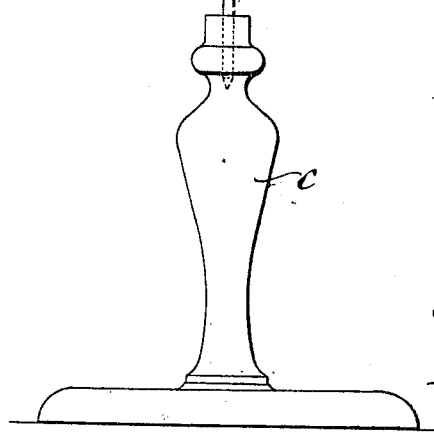
Figure 3:
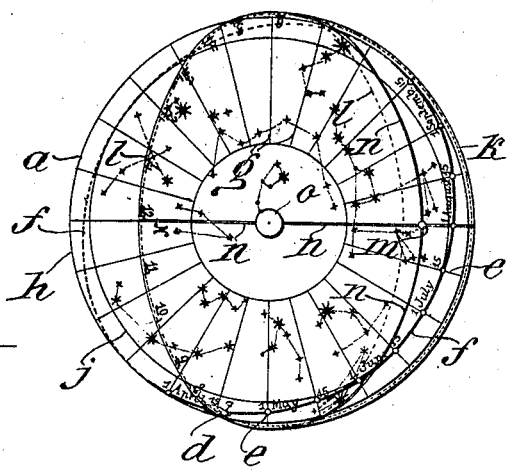

The invention is illustrated, by way of example, in the annexed drawings, in which Figure 1 is a side view of the globe; Fig. 2, a front view; and Fig. 3 a top plan view seen in the direction of arrow A, Fig. 1.

The globe $a$ is arranged rotatable around its axis $b$, which is held in a suitable support $c$. The celestial bodies are indicated on the globe $a$. A knob $d$ or the like, representing the sun, is arranged on said globe in holes $e$, extending along the ecliptic $f$.

Along the ecliptic or on that southerly globe-section which corresponds to the portion of the sky never visible in our northerly latitudes the names or numbers of the months and, if space allows, numerals representing some or all days are indicated, and vertical circles $g$ are drawn through the different points of the scale thus formed in such a manner that the points of section of the said circles, with the ecliptic, exactly indicate the position of the sun on the day to which each vertical circle belongs. In the drawings for the purpose of clearness only the vertical circles corresponding to the 1st and 15th of each month are indicated; but it is obvious that on globes of greater diameter the vertical circles corresponding to each day will be indicated.

$h$ is the equator, and $j$ are the tropics.

On the globe is arranged the hemispherical transparent or perforated cap $k$, which is rotatable about the axis $b$ and is so adjusted that its edge $l$ corresponds to the horizon of the locality at which the globe is to be used. The highest point of the firmament—the zenith—is indicated on the cap by a small circle $m$, and along the edge of the cap are indicated the cardinal points of the compass, vertical lines $n$, meeting at $m$, being further drawn on the cap for indicating the four points of the compass. Along the edge of the cap are further indicated the hours of day and night, which may be subdivided, if desired. $o$ is a screw holding the cap and the globe on the axis $b$.

The globe is used in the following manner: In order to indicate the varying position of the sun, the knob $d$ is inserted into that hole $e$ which is bisected by the vertical circle corresponding to the date on which the adjustment is made. The globe is then rotated under the cap $k$ until the numeral indicating the hour at which the observation is made also coincides with the said circle $g$. The cap covers in this position all that part of the sky which is visible from the place of observation at the hour at which the observation is made, and the various constellations can be easily identified, more particularly if the globe is adjusted in accordance with the points of the compass with the edge of the cap parallel with the horizon. By simply rotating the globe under the cap the apparent movement of the sun during the day in question is indicated exactly, and at the same time the time and locality of the rising and setting of the sun and stars can be ascertained. For obtaining the same particulars for any other day it is only necessary to adjust the knob $d$ for that day and to repeat the operation described. The same cap can be used for places in other latitudes; but for this purpose supports or bearings for the cap must be provided in different positions. It is obvious that the arrangement described can be modified by providing the cap or bowl with the stellar map, date-lines, and ecliptic-path, and marking the hours and the points of the compass on the globe. The identification of constellations shown on the globe with constellations visible in the sky allows, of course, of determining with the aid of the globe time and the points of the compass, so that the globe can also be used as a compass and as a sun or star dial. The globe is also suitable for use as a means for imparting to students the fundamental principles of astronomical geography.

Having now described my invention, what I claim, and desire to secure by Letters Patent of the United States, is—

A celestial globe, an axis upon which said globe is rotatably mounted, the surface of said globe having division-lines thereon lying in planes passing longitudinally through said axis, the surface of said globe also having a line intersecting said first-mentioned lines and representing the plane of the ecliptic, a knob adapted to be arranged at any one of the points of intersection of said lines and representing the sun, a transparent cap arranged rotatable around the axis of the globe and the edge of which corresponds to the horizon of the place where the globe is to be used, means for indicating the points of the compass on said cap and means for indicating the hours of the day on said cap, substantially as described and for the purpose set forth.

In testimony whereof I have signed my name to this specification in the presence of two subscribing witnesses.

FRANZ MALINA.

Witnesses:
   HANS PAPPENHEIM,
   ALVESTO S. HOGUE.